United States Patent
Laganakos et al.

(10) Patent No.: US 11,308,699 B2
(45) Date of Patent: Apr. 19, 2022

(54) METHOD AND SYSTEM FOR DATA GENERATION

(71) Applicant: Arm Limited, Cambridge (GB)

(72) Inventors: Vasileios Laganakos, Cambridge (GB); Irenéus Johannes De Jong, Cambridge (GB); Gary Dale Carpenter, Cambridge (GB)

(73) Assignee: Arm Limited, Cambridge (GB)

(*) Notice: Subject to any disclaimer, the term of this patent is extended or adjusted under 35 U.S.C. 154(b) by 205 days.

(21) Appl. No.: 16/823,003

(22) Filed: Mar. 18, 2020

(65) Prior Publication Data
US 2021/0279964 A1    Sep. 9, 2021

(30) Foreign Application Priority Data
Mar. 3, 2020  (EP) ..................... 20386014

(51) Int. Cl.
| | |
|---|---|
| *G06T 19/00* | (2011.01) |
| *G06N 20/00* | (2019.01) |
| *G06K 9/62* | (2022.01) |
| *G06V 20/30* | (2022.01) |
| *G06V 20/64* | (2022.01) |

(52) U.S. Cl.
CPC .......... *G06T 19/006* (2013.01); *G06K 9/6265* (2013.01); *G06N 20/00* (2019.01); *G06V 20/30* (2022.01); *G06V 20/64* (2022.01); *G06T 2219/004* (2013.01)

(58) Field of Classification Search
CPC . G06T 19/006; G06T 2219/004; G06T 19/00; G06T 15/005; G06T 7/70; G06T 19/20; G06T 17/00; G06T 1/20; G06T 15/20; G06K 9/00677; G06K 9/00201; G06K 9/6265; G06K 9/6273; G06K 9/00; G06K 9/62; G06K 9/6256; G06K 9/6271; G06K 9/627; G06N 20/00; G06F 3/04815; G06F 3/0346
See application file for complete search history.

(56) References Cited

U.S. PATENT DOCUMENTS

| | | | |
|---|---|---|---|
| 2015/0010202 A1* | 1/2015 | Tuzel ...................... | G06T 7/75 382/103 |
| 2019/0096035 A1* | 3/2019 | Li ........................ | G06T 3/4053 |
| 2021/0150807 A1* | 5/2021 | Zhou ................... | G06K 9/00664 |

* cited by examiner

*Primary Examiner* — Xilin Guo
(74) *Attorney, Agent, or Firm* — EIP US LLP

(57) ABSTRACT

A computer-implemented method includes generating, using a scene generator, first candidate scene data; obtaining reference scene data corresponding to a predetermined reference scene; processing the first candidate scene data and the reference scene data, using a scene discriminator, to generate first discrimination data for estimating whether each of the first candidate scene data and the reference scene data corresponds to a predetermined reference scene; updating a set of parameter values for the scene discriminator using the first discrimination data; generating, using the scene generator, second candidate scene data; processing the second candidate scene data, using the scene discriminator with the updated set of parameter values for the scene discriminator, to generate second discrimination data for estimating whether the second candidate scene data corresponds to a predetermined reference scene; and updating a set of parameter values for the scene generator using the second discrimination data.

17 Claims, 4 Drawing Sheets

METHOD AND SYSTEM FOR DATA GENERATION

CROSS-REFERENCE TO RELATED APPLICATIONS

This application claims the benefit under 35 U.S.C. § 119(a) and 37 CFR § 1.55 to European patent application no. EP 20386014.3, filed on Mar. 3, 2020, the entire content of which is incorporated herein by reference.

BACKGROUND OF THE INVENTION

Field of the Invention

The present invention relates to machine learning systems. The invention has particular, but not exclusive, relevance to the generation of training data for machine learning systems.

Description of the Related Technology

Machine learning systems for performing image-based tasks such as object detection, scene recognition, segmentation, simultaneous localization and mapping (SLAM), and depth inference from monocular images, have applications in robotics, autonomous vehicles, closed-circuit television (CCTV) and a range of other technologies. Recent advances in sensor technology, including for example stereoscopic cameras, event cameras, infrared cameras, sound navigation ranging (sonar), and light detection and ranging (LIDAR) systems, allow for accurate depth information to be captured alongside conventional two-dimensional images. This depth information can be leveraged to improve the performance of such machine learning systems.

Machine learning systems of the type mentioned above are typically trained using supervised learning, which requires labeled training data, for example images of scenes of a type relevant to the task to be performed, segmented and/or including bounding boxes with class labels for objects appearing in the scene. Training data of this type may also be used for training decision making systems, for example in the context of automated robots or automated vehicles. However, such labeled training data can be difficult to obtain.

The task of annotating images for use as training data for machine learning systems is conventionally performed manually by humans. However, this task is extremely time-consuming, particularly in the case of images containing depth information, in which case annotating is more complicated, for example because bounding boxes must be positioned and oriented in three dimensions. Furthermore, many supervised learning methods for image-based tasks are data hungry, meaning a large quantity of training data is necessary to successfully train the machine learning system.

In some examples, images of real scenes captured by a camera contain sensitive or private information which cannot be freely distributed due to data security regulations or concerns. Examples include information contained within private locations such as offices or warehouses, and images which accidentally include people without the consent of those people. To use such images as training data, an additional step must be performed to obfuscate the private or sensitive information contained within the image, before the training data can be publicly distributed.

SUMMARY

According to a first aspect, there is provided a computer-implemented method The method includes generating, using a scene generator, first candidate scene data indicating a position and orientation for each of a first candidate set of three-dimensional objects with respect to a given co-ordinate system; obtaining reference scene data corresponding to a predetermined reference scene and indicating a position and orientation for each of a reference set of three-dimensional objects with respect to the given co-ordinate system; processing the first candidate scene data and the reference scene data, using a scene discriminator, to generate first discrimination data for estimating whether each of the first candidate scene data and the reference scene data corresponds to a predetermined reference scene; updating a set of parameter values for the scene discriminator using the first discrimination data; generating, using the scene generator, second candidate scene data indicating a position and orientation for each of a second candidate set of three-dimensional objects with respect to the given co-ordinate system; processing the second candidate scene data, using the scene discriminator with the updated set of parameter values for the scene discriminator, to generate second discrimination data for estimating whether the second candidate scene data corresponds to a predetermined reference scene; and updating a set of parameter values for the scene generator using the second discrimination data.

Scenes of a common scene type share latent information underlying relative positions and orientations of objects, along with other properties of the scenes. By training the scene generator using reference scene data which directly indicates positions and orientations of objects in the scene, the scene generator implicitly learns this latent information, allowing for realistic scenes to be generated. In some examples, the scene generator is trained to generate additional scene properties, such as lighting and weather effects, based on the reference scene data, further allowing for the generation of visually realistic scenes which can be reliably used as training data for a range of machine learning applications.

Further features and advantages of the invention will become apparent from the following description of preferred embodiments of the invention, given by way of example only, which is made with reference to the accompanying drawings.

DETAILED DESCRIPTION OF CERTAIN INVENTIVE EMBODIMENTS

Figure 1:
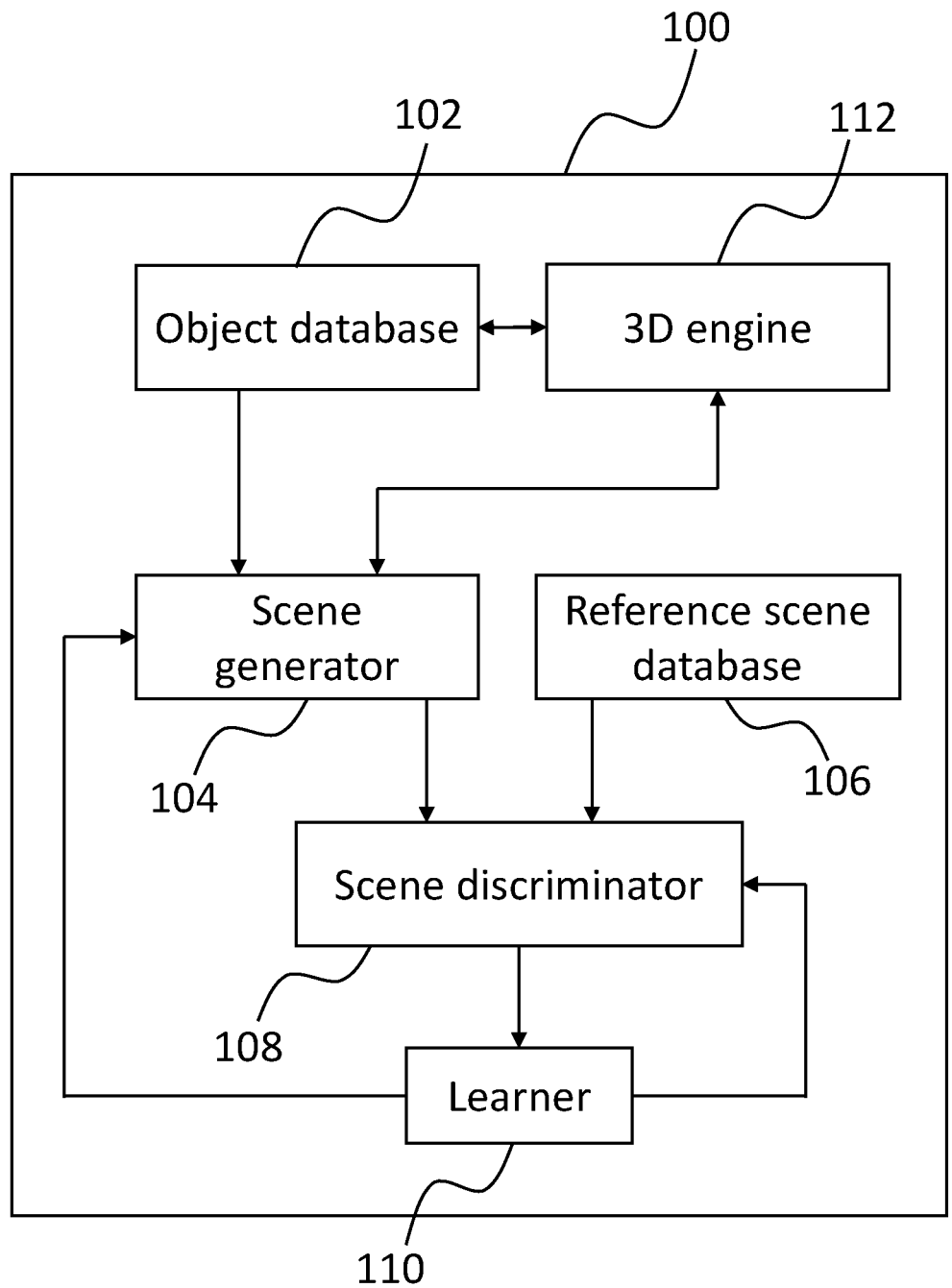
FIG. 1 is a schematic block diagram representing a data processing system arranged in accordance with examples.

FIG. 1 shows a data processing system 100 arranged to generate synthetic three-dimensional scenes each containing a respective set of three-dimensional objects. The system 100 includes an object database 102 arranged to store a large number of candidate three-dimensional objects for use in constructing the three-dimensional scenes. Each three-dimensional object in the object database 102 includes a set of object parameters including shape parameters defining the shape of the object in three dimensions, and optionally including skin parameters defining colours, textures, and other properties of the surfaces of the object. Each object is stored in association with one or more class labels indicating object classes to which the object belongs. Object classes may be defined narrowly or broadly and may be hierarchical such that objects associated with a broad object class such as "furniture" may be further be associated with a narrower sub-class classes such as "chair", "table" and so on.

The data processing system 100 includes a scene generator 104, which is operable to generate scene data for arranging objects stored in the object database 102. The generated scene data indicates a position and orientation of each of a set of three-dimensional objects with respect to a given co-ordinate system. In the present example, the scene data is in the form of one or more numerical arrays indicating transformations to a default position and orientation of each of the objects in the set, for example including translations and rotations in three-dimensions. In one example, the default position and orientation of the objects is defined using a global co-ordinate system for the scene and a respective object co-ordinate system for each object with an origin at a predetermined location within the object (for example, a geometric centre of the object or a corner of a bounding box containing the object). The global co-ordinate system and each object co-ordinate system may be, for example, a Cartesian co-ordinate system of any other suitable co-ordinate system. Specific implementations of the scene generator 104 will be described hereafter.

The data processing system 100 includes a reference scene database 106 arranged to store reference scene data corresponding to predetermined reference scenes. The predetermined reference scenes are not generated by the scene generator 104. In this example, the predetermined reference scenes are of a common scene type and are derived from real-life scenes, as discussed in more detail hereafter. A scene type refers to a particular type of environment in which the reference data is captured. For example, indoor scene types may include "kitchen", "office", "bathroom", etc. Outdoor scene types may include "city", "roadway", "forest", etc. Scene types may be defined more broadly or more narrowly than these examples, depending on the application.

The reference scene data for a given reference scene indicates a position and orientation of each of a reference set of three-dimensional objects. The reference scene data stored in the reference scene database 106 is therefore comparable with scene data generated by the scene generator 104. In the present example, the reference scene data stored in the reference scene database 106 is generated by processing images of real-life scenes (for example, images containing depth information, such as RGB-D images) using a trained computer vision system to determine positions and locations of objects in the real-life scenes, along with associated object classes for the objects. In some examples, the reference scene data includes additional information determined from real-life scenes, for example information relating to lighting and/or weather conditions. In some examples, reference scene data is generated by a human user manually annotating images of real-life scenes.

The data processing system 100 includes a scene discriminator 108 operable to process scene data received from either the scene generator 104 or the reference scene database 106, to generate discrimination data. The discrimination data can be used to estimate whether the received scene data originated from the reference scene database 102 or the scene generator 104, and hence whether the scene data corresponds to a real scene or a synthetic scene.

The data processing system 100 includes a computer-implemented learner 110 operable to update parameter values for the scene generator 104 and the scene discriminator 108, thereby to train the scene generator 104 and the scene discriminator 108. As will be explained in more detail hereafter, training the scene discriminator 108 improves the ability of the scene discriminator 108 to correctly to discriminate between real or artificial scene data, or in other words to correctly determine whether received scene data corresponds to a predetermined reference scene, as opposed to having been generated by the scene generator 104. Training the scene generator 104 improves the ability of the scene generator 104 to generate scene data which the scene discriminator 108 incorrectly identifies as real scene data.

The data processing system 100 includes a three-dimensional engine 112 operable to process scene data generated by the scene generator 104, to generate a corresponding synthetic three-dimensional scene from objects stored in the object database 102. The synthetic scene generated by the three-dimensional engine 112 in this example includes a volumetric representation of the objects positioned and oriented in accordance with the scene data. In some examples, the three-dimensional engine includes a rendering engine for rendering the synthetic three-dimensional scene, for example as an image or a sequence of images forming a video. The rendering engine may also generate depth information for the generated image or video (for example, resulting in an RGB-D image or video). In some examples, the three-dimensional engine 112 includes a physics engine responsible for emulating physical interactions of objects within the synthetic scene, including for example collision detection. In some examples, the three-dimensional engine is able to modify object parameters of objects stored in the object database 102, for example to modify the textures, colours, or shapes of the objects. In some examples, the three-dimensional engine is able to modify lighting conditions in a generated synthetic three-dimensional scene, for example using volumetric rays, or other conditions such as weather conditions for outdoor scenes. Suitable three-dimensional engines for the above purposes will be known to those skilled in the art, for example in the context of video game engines.

Figure 2:
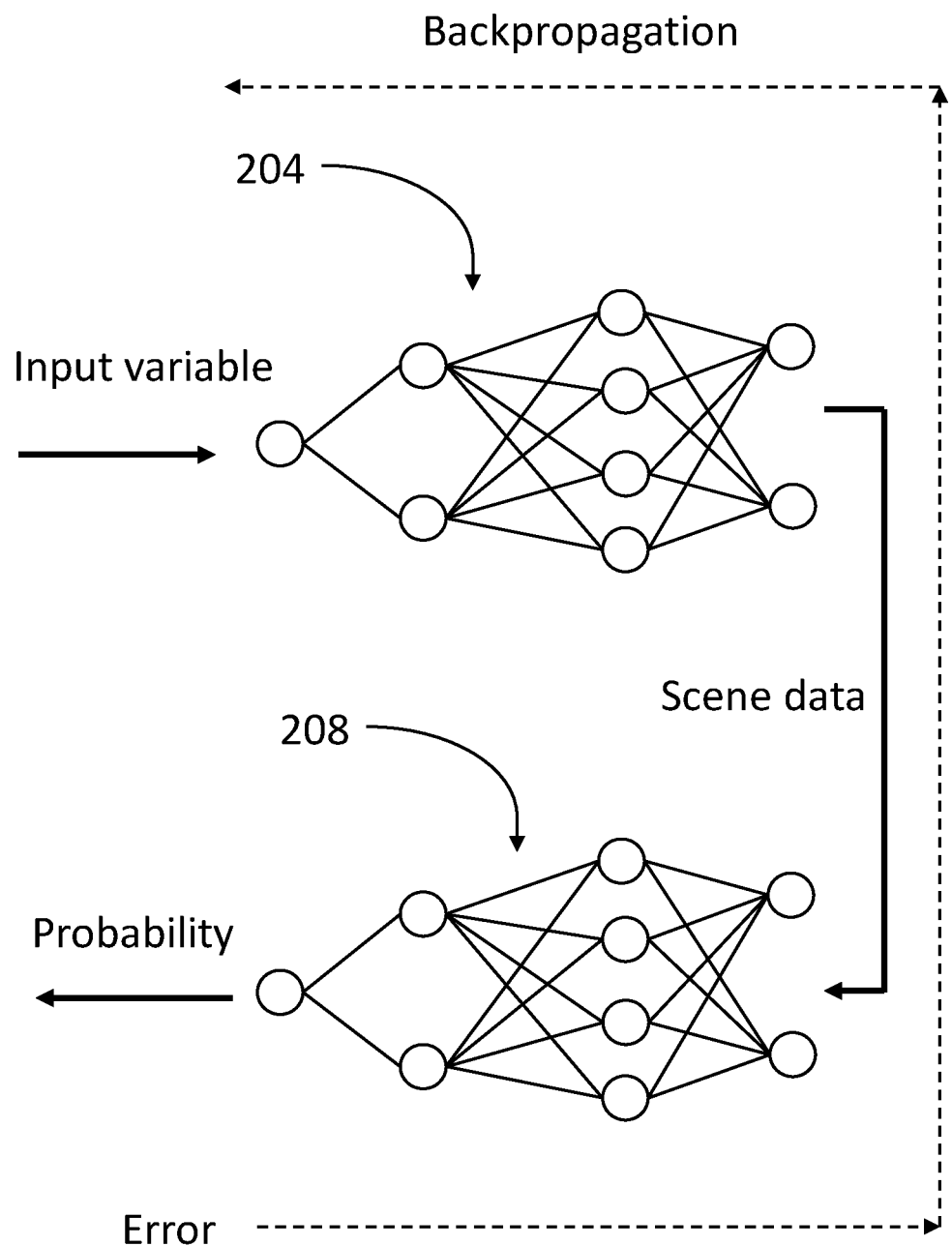
FIG. 2 shows an example of two artificial neural networks

In the present example, the scene generator 104 includes an artificial neural network referred to as a generator network 204 having a first input layer, one or more hidden layers, and a first output layer, each layer containing one or more neurons. As shown in FIG. 2, the generator network 204 is arranged to process an input variable using a set of parameter values of the generator network 204, to generate scene data. In this example, the generator network 204 is shown as having a first input layer with a single input neuron (corresponding to a one-dimensional input variable), two hidden layers with two and four neurons respectively, and a first output layer with two output neurons (corresponding to two-component scene data). It will be appreciated that the generator network 204 has been shown as having a relatively low number of layers and neurons for the sake of clarity, whereas in reality the first neural network 204 would have a greater number of layers and a greater number of neurons in each layer. In some examples, a generator network has multiple input neurons, corresponding to a multi-dimensional input variable. Scene data generated by the first neural network 204 will typically have a greater number of components than two. Furthermore, the first neural network 204 is shown as fully connected. Other network architectures are possible without departing from the scope of the invention, for example including convolutional layers or a combination of convolutional and fully connected layers.

When the generator network 204 processes a noise variable (i.e. random variable) sampled from a predetermined prior distribution (for example, a Gaussian noise distribution, a Poisson noise distribution, a white noise distribution, or any other suitable noise distribution), the input variable will provide a source of randomness which will result in the scene generator 104 generating scene data corresponding to a new, unseen, synthetic scene.

In the present example, the scene discriminator 108 includes a second artificial neural network referred to as a discriminator network 208 having a second input layer, one or more hidden layers, and a second output layer. As shown in FIG. 2, the discriminator network 208 is arranged to process scene data to generate discrimination data for estimating whether the scene data corresponds to a predetermined reference scene. In this example, the discriminator network 208 has a single output neuron arranged such that the activation of the output neuron when scene data is processed indicates (directly or indirectly) whether the scene data corresponds to a predetermined reference scene. Similarly to the generator network 204, the discriminator 208 is shown in simplified form in FIG. 2, and would in reality have a greater number of neurons and layers, and can have any suitable network architecture.

Parameters of the scene generator 104 and the scene discriminator 108 include trainable parameters of the generator network 204 and the discriminator network 208, including for example connection weights and biases. When scene data is processed by the scene discriminator 108 to generate discrimination data, the trainable parameters of the discriminator network 208 can be updated using backpropagation through the discrimination network 208 of a gradient of a suitably defined objective function using any suitable gradient-based optimization method (for example, stochastic gradient descent/ascent, Adam, stochastic gradient descent/ascent with momentum), as will be understood by those skilled in the art. In the present example, for scene data received from the reference scene database 106, the objective function decreases as the estimated probability that the scene corresponds to a predetermined reference scene increases. For scene data generated by the scene generator 104, the objective function increases as the estimated probability that the scene corresponds to a predetermined reference scene increases. In this way, the scene discriminator 104 can be trained to improve its ability to correctly discriminate between real or artificial scene data.

When an input variable is processed by the scene generator 104 to generate scene data, which is subsequently processed by the scene discriminator 108 to generate discrimination data, the trainable parameters of the generator network 204 can be updated by backpropagation through the discriminator network 208 and the generator network 208 of a suitably defined objective function and any suitable gradient-based optimization method (as shown by the dashed line in FIG. 2). The objective function in this case increases as the estimated probability of the scene data corresponding to a predetermined reference scene increases. In this way, the scene generator 108 can be trained to improve its ability to generate scene data which the scene discriminator 108 incorrectly identifies as real scene data. Specific examples of suitable objective functions will be described in more detail hereafter.

The generator network 204 and the discriminator network 208 include further parameters, referred to as hyperparameters, which are not modified during training. Examples of these hyperparameters include parameters defining the network architectures of the generator network 204 and the discriminator network 208.

Other implementations of scene generators and scene discriminators are possible. For example, a scene generator and/or a scene discriminator can be implemented using, additionally or alternatively, Gaussian process models or deep Gaussian process models. Some examples of scene generators or scene discriminators may be trained using, for example, Bayesian optimization or evolutional methods, instead of using gradient-based optimization.

The scene generator 104 and the scene discriminator 108 according to the present invention are adversarial in that the scene discriminator 108 is trained to accurately identify whether a given scene is real or synthetic, and the scene generator 104 is simultaneously trained to generate synthetic scenes which the scene discriminator 108 cannot identify as being synthetic. The scene generator 104 and the scene discriminator 108 are trained using similar principles to generative adversarial nets in the field of image processing, which typically use convolutional/deconvolutional networks to generate and process images in a pixelwise manner. Generative adversarial nets of this type have been used successfully for generation of near-photorealistic images. Instead of generating images in a pixelwise manner, the scene generator 104 generates scene data for transforming and manipulating three-dimensional object models generated by the three-dimensional engine 112. As a result, the resulting scenes are already perfectly segmented and labeled and can therefore be used as training data for a machine learning system without requiring any further annotation. Furthermore, the scene data directly specifies the positions and orientations of the three-dimensional objects, and therefore latent information underlying the relative positions and distributions of objects within a scene is learned independently of other information which would otherwise appear in an image, for example colour and texture information. The present method therefore provides a more effective and less data-hungry method of generating realistic scenes. Nevertheless, in some examples, reference scene data for a given reference scene includes an image of the given reference scene in addition to data indicating positions and orientation of a reference set of objects in the given reference scene. In such examples, the scene generator is arranged to generate scene data in the same format using the three-dimensional engine, and the discriminator network is arranged to process images of scenes in conjunction with data indicative of the locations and orientations of objects within the scenes.

In some examples, scene data has a relatively low dimensionality compared with a typical image, and therefore the scene generator 104 and the scene discriminator 108 can be successfully implemented with relatively simple network architectures compared with the convolutional/deconvolutional networks typically used for image generation. As a result, the training process is more efficient, and the trained parameters of the networks are relatively compact. In some cases, it may be desirable to provide trained parameter values of the scene generator as part of a computer program product, for example as part of a package for generating training data for machine learning systems. Alternatively, scene data generated by the scene generator 104 may be distributed to one or more receiver nodes, for example over a network, with each receiver node having a compatible three-dimensional engine and the capability to interpret the scene data such that identical scenes can be generated at the receiver side. Providing scene data in this way is more efficient in terms of bandwidth than distributing synthetic three-dimensional scenes generated at the sender side.

Figure 3:
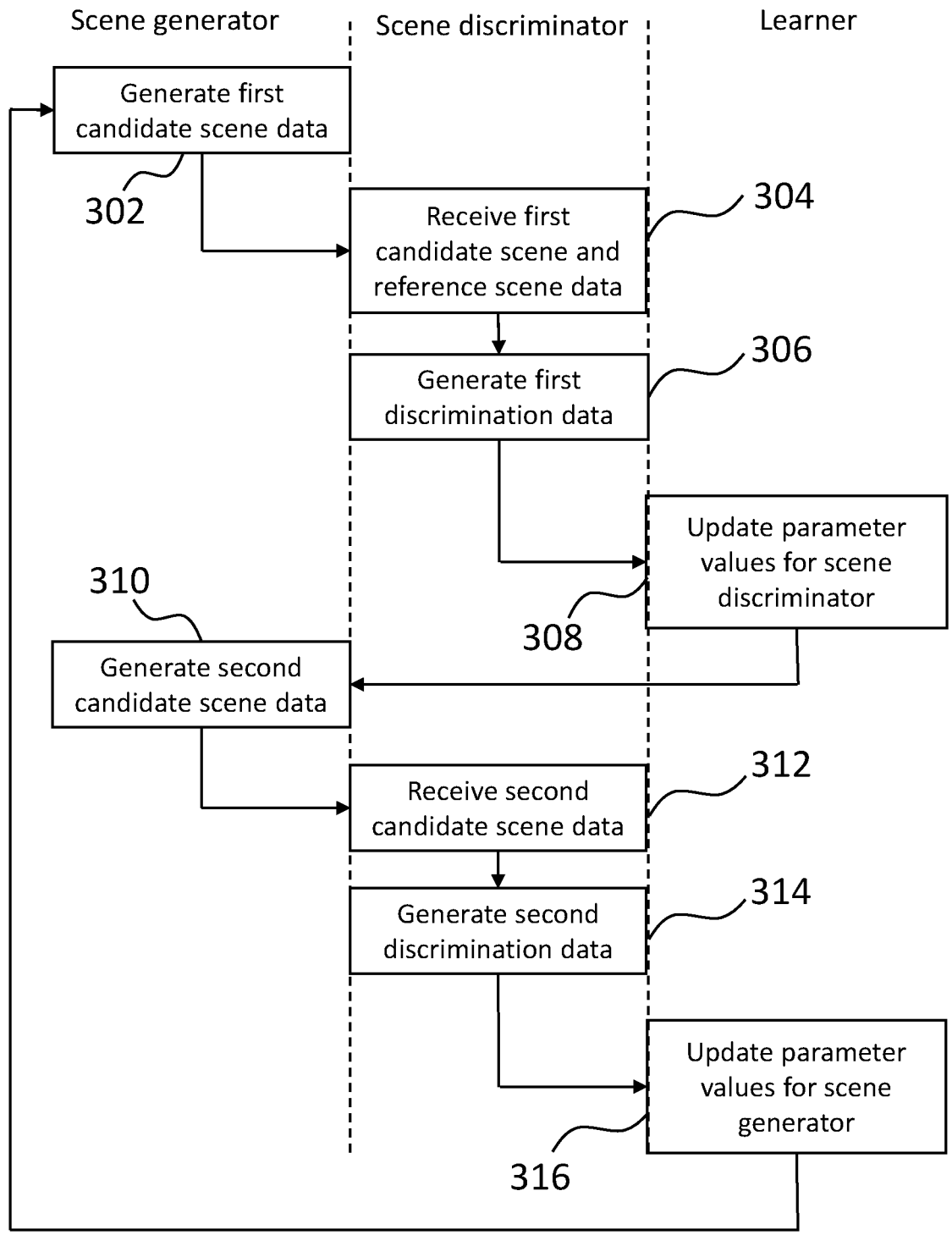
FIG. 3 is a flow diagram representing a method of training a scene generator in accordance with examples.

FIG. 3 shows an example of a method of training the scene generator 104 to generate scene data corresponding to synthetic three-dimensional scenes. The scene generator 104 generates, at 302, first candidate scene data indicating a position and orientation for each of a first candidate set of objects with respect to a given co-ordinate system. In the present example, the first candidate set of objects is predetermined. For example, for a scene type "office", the first candidate set of objects may include an office chair, a desk, a computer, and so on. In other examples, the first candidate set of objects is not predetermined, and instead is selected during the generating of the first candidate scene data, for example randomly from predetermined object classes appropriate to the given scene type. In some examples, the candidate scene data includes numerical values from which a selection of objects can be determined. For example, in the present case where the scene generator 104 is implemented using the generator network 204, one or more output neurons of the generator network may be used to determine selections of objects.

The scene discriminator 108 receives, at 304, the first candidate scene data from the scene generator 104, along with reference scene data from the reference scene database 106. The reference scene data indicates a position and orientation for each of a reference set of three-dimensional objects with respect to the given co-ordinate system.

The scene discriminator 108 processes, at 306, each of the first candidate scene data and the reference scene data, to generate first discrimination data. The first discrimination data can be used to estimate whether each of the first candidate scene data and the reference scene data corresponds to a predetermined reference scene. In the present example, the first discrimination data includes activation values for neurons in the discriminator network 208 when each of the first candidate scene data and the reference scene data are processed by the discriminator network 208, including the activations of the output neuron, which correspond to estimated probabilities of the first candidate scene data and the reference scene data corresponding to predetermined reference scenes.

The learner 110 updates, at 308, parameter values for the scene discriminator 108 using the first discrimination data. In this example, the learner 110 updates the values of the trainable parameters of the discriminator network 208 using gradient ascent for a discriminator objective composed two error terms, as given by Equation (1):

$$\text{descriminator objective} = \log(P_R) + \log(1-P_{C1}), \quad (1)$$

where $P_R$ is the probability estimated by the scene discriminator 108 that the reference scene data corresponds to a predetermined reference scene and $P_{C1}$ is the probability estimated by the scene discriminator 108 that the first candidate scene data corresponds to a predetermined reference scene. Other discriminator objectives are possible without departing from the scope of the invention. The discriminator objective increases as the estimated probability $P_R$ increases and decreases as the estimated probability $P_{C1}$ increases. The gradient of the discriminator objective with respect to the trainable parameters of the discriminator network 208 is determined by backpropagation through the discriminator network 208.

The scene generator 104 generates, at 310, second candidate scene data indicating a position and orientation for each of a second candidate set of objects with respect to a given co-ordinate system. In the present example, activations of the neurons of the generator network 204 are stored during the processing of the second candidate scene data, allowing for backpropagation through the generator 204 to be performed.

The scene discriminator 108 receives, at 312, the second candidate scene data from the scene generator 104 and processes, at 314, the second candidate scene data to generate second discrimination data. The second discrimination data can be used to estimate whether the second candidate scene data corresponds to a predetermined reference scene. In the present example, the second discrimination data includes activation values for neurons in the discriminator network 208 when the second candidate scene data is processed by the discriminator network 208, including the activation of the output neuron, which correspond to estimated probability of the second candidate scene data corresponding to a predetermined reference scene.

The learner 110 updates, at 316, parameter values for the scene generator 104 using the second discrimination data. In this example, the learner 110 updates the values of the trainable parameters of the generator network 204 using gradient ascent for a generator objective given by Equation (2):

$$\text{generator objective} = -\log(1-P_{C2}), \quad (2)$$

where $P_{C2}$ is the probability estimated by the scene discriminator 108 that the second candidate scene data corresponds to a predetermined reference scene. Other generator objectives are possible without departing from the scope of the invention. An example of an alternative generator objective is $\log P_{C2}$. The discriminator objective increases as the estimated probability $P_{C2}$ increases. The gradient of the generator objective with respect to the trainable parameters of the generator network 204 is determined by backpropagation through the discriminator network 208 and the generator network 204.

The discriminator and generator objectives of Equations (1) and (2) are based on estimated probabilities. For this purpose, the outputs P of the discriminator network are constrained to lie between 0 and 1 (for example, by using a suitable activation function such as a sigmoid activation function at the output of the discriminator network 208). In other examples, outputs of a discriminator network are not constrained in this way, in which case the outputs cannot be directly interpreted as probabilities. However, the outputs can still be indicative of whether scene data corresponds to a predetermined reference scene (for example, with a higher value indicating a higher probability of this being the case). An example of an alternative discriminator objective function not based on probabilities is given by Equation (3):

$$\text{alternative descriminator objective} = \text{output}_R - \text{output}_{C1}, \quad (3)$$

where $\text{output}_R$ is the output of the discriminator network 208 when the reference scene data is processed, and $\text{output}_{C1}$ is the output of the discriminator network 208 when the first candidate scene data is processed. This alternative discriminator objective measures a distance between the reference scene data and the first candidate scene data. At 308, the learner 110 updates the parameter values of the scene discriminator to increase the distance between the reference scene data and the first candidate scene data. The corresponding alternative generator objective is given by Equation (4):

$$\text{alternative generator objective} = \text{output}_{C2}, \quad (4)$$

where $\text{output}_{C2}$ is the output of the discriminator network 208 when the second candidate scene data is processed. Other objectives are possible, for example based on other types of distance function.

The method of FIG. 3 is performed iteratively, returning to 302 once the parameter values for the scene generator 104 have been updated at 316. Although in the present example a single update of the scene discriminator 108 is performed for each update of the scene generator 104, in other examples several updates of the scene discriminator 108 may be performed for each update of the scene generator 104, or vice versa. In the present example, each update of the scene generator 104 used first candidate scene data corresponding to a single scene, and each update of the scene discriminator 108 used second candidate scene data corresponding to a single scene and reference scene data corresponding to a single scene. In other examples, minibatches of scene data are used for each update, in which case the resulting objective functions include a sum of terms. This results in the stochastic updates of the scene generator 104 and the scene discriminator 108 having a lower variance, but results in a higher computational cost per iteration of the method.

Figure 4A:
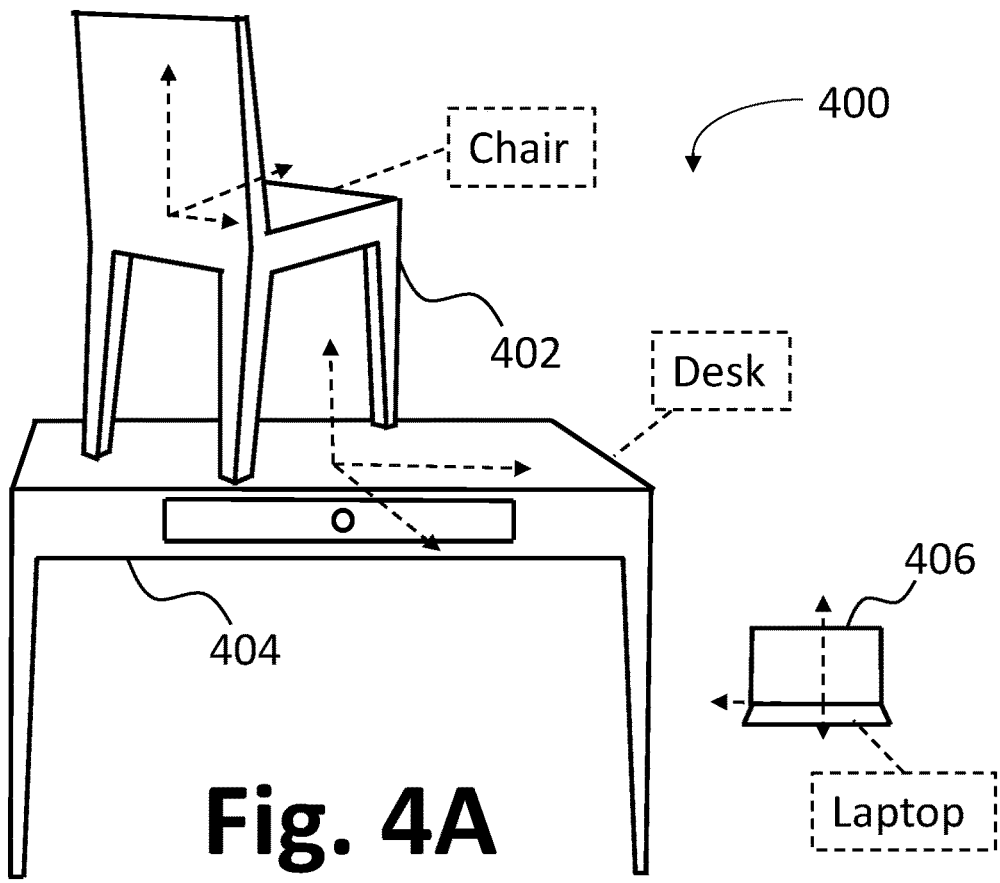
FIGS. 4A and 4B show examples of three-dimensional scenes generated by a scene generator in accordance with examples.
Figure 4B:
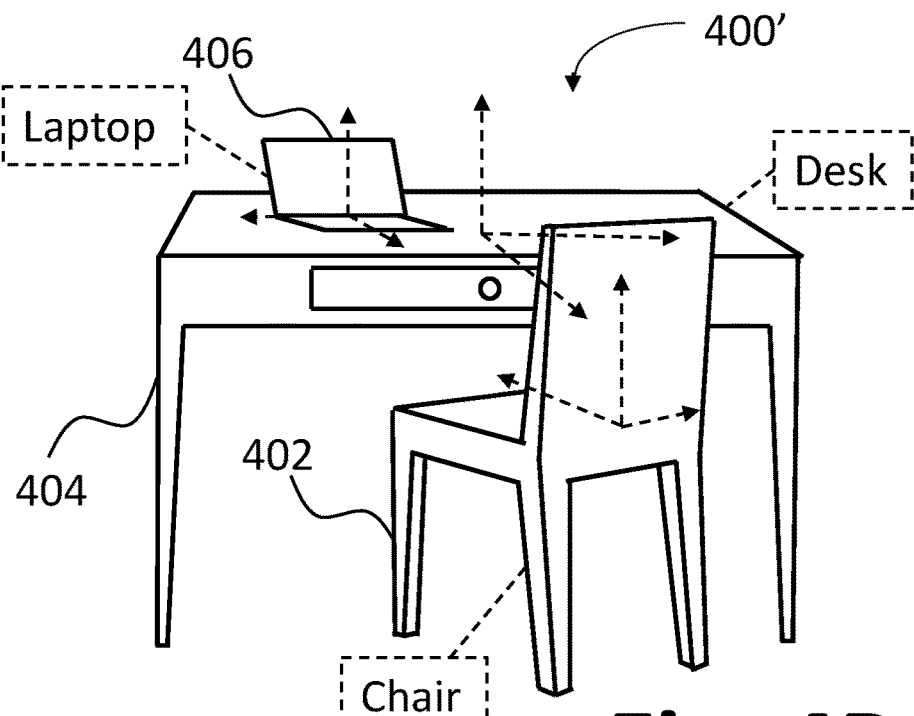

Prior to the first training iteration, the values of the parameters of the scene generator 104 are initialized, for example by being set to random values. During the early training iterations, the scene generator 104 will generate candidate scene data which bears little or no resemblance to the reference scene data. FIG. 4A shows an illustrative example of a candidate scene generated by the three-dimensional engine 112 processing candidate scene data generated by the scene generator 104 during an early training iteration. The candidate scene includes three objects, a chair 402, a desk 404 and a laptop 406. Each object is labeled with a corresponding object classification, and each has an orientation and position shown by a respective set of three-dimensional object axes. It is observed that the chair 402 is positioned on top of the desk 404, and the laptop 406 is positioned on the floor. The resulting scene does not resemble scenes from the reference scene database 106, and as a result appears unrealistic. FIG. 4B shows an example of a candidate scene containing the same three objects, generated by the three-dimensional engine 112 processing candidate scene data generated by the scene generator 104 during a later training iteration, after the parameter values of the scene generator 104 have been updated over multiple training iterations. In this example, the chair 402 is positioned in front of the desk 404, facing substantially towards the desk 404, and the laptop 406 is positioned on top of the desk 404, facing towards the chair 406. The resulting scene resembles scenes from the reference scene database 106, and as a result appears realistic.

By alternating updates of the scene discriminator 108 and the scene generator 104 as described above, the efficacy of each iteratively improves at performing its respective task. Provided that enough reference scene data is available, the scene discriminator eventually becomes highly accurate in determining whether any given scene data is real or artificial. The scene generator 104 is nevertheless eventually able to generate scenes which the discriminator network 108 cannot accurately distinguish from the predetermined reference scenes. When this situation is achieved, the scene generator is trained and ready to be used for generating synthetic three-dimensional scenes.

Once the training process of FIG. 3 is complete, the scene generator 104 can be used to generate output scene data indicating a position and orientation for each of an output set of three-dimensional objects with respect to the given coordinate system. The three-dimensional engine 112 can then process the output scene data to generate a corresponding synthetic three-dimensional scene. In some examples, the three-dimensional engine 112 is arranged to render the generated synthetic three-dimensional scene to generate a corresponding image or video of the generated synthetic three-dimensional scene. The resulting image may include depth information. In some examples, the data processing system 100 is arranged to generate annotation data indicating the positions and orientations of the three-dimensional objects in the generated synthetic three-dimensional scene. The annotation data may include, for example, three-dimensional bounding boxes and/or class labels for each object in the generated scene. Synthetic three-dimensional scenes annotated in this way are suitable for use in training machine learning systems.

As mentioned above, in some examples the three-dimensional engine 112 can be used to modify object parameters of objects within a generated synthetic three-dimensional scene. In such examples, the candidate scene data and reference scene data used to train the scene generator 104 can include object parameters, for example shape parameters or skin parameters of objects in the respective scenes. In this way, the scene generator 104 can be trained to modify objects, as well as to position and orient objects, within a generated scene. The object parameters of the modified objects may then be stored in the object database 102 for use in generating further scene data in future.

In some examples, the three-dimensional engine 112 can be used to modify lighting conditions within a generated synthetic three-dimensional scene, for example using volumetric rays. Alternatively, or additionally, in some examples the three-dimensional engine 112 can be used to generate artificial weather conditions, such as cloudy, sunny, foggy or rainy weather conditions, for example in the case of an outdoor scene. In such examples, the candidate scene data and the reference scene data can include information relating to one or more lighting conditions and/or weather conditions for the respective scenes, allowing the scene generator 104 to be trained to determine lighting conditions and/or weather conditions for the given scene.

In some examples, the scene generator 104 generates scene data in two distinct steps, for example a first step to arrange the objects in the scene, and a second step to modify the object parameters and/or lighting conditions. In some of these examples, the scene generator 104 includes separate generator networks for each of these steps, and the scene discriminator accordingly include separate discriminator networks. In this case, training the separate networks is performed in two distinct stages.

In certain situations, an entity may wish to distribute training data to be used for training machine learning systems, for example to customers or business partners. However, a real-life image dataset (for example, a real-life RGB-D dataset) may contain private or sensitive information which the entity is not free to distribute. By using the real-life dataset as a reference dataset in accordance with the methods described herein, a new synthetic dataset can be generated based on scene data with the same underlying distribution and therefore capturing the relevant latent information, but not containing any of the sensitive or private information contained within the original real-life dataset. For example, in the case of a dataset for training an object detection system of an autonomous vehicle, any people appearing in the synthetic dataset can be generic models of people and accordingly would not have the faces of individual people which could otherwise be linked to the identities of those people. Alternatively, people could be omitted altogether from the dataset.

The data processing system 100 described above may be a single machine or as a distributed system including multiple compute nodes. The components of the data processing system 100 may be implemented using any suitable processing circuitry and memory circuitry. In particular, processing by the generator network 204 and the discriminator network 208 may be performed using specialist processing hardware, for example a neural processing unit (NPU) or neural network accelerator. In one example, a semiconductor device is provided with logic gates arranged to perform the processing functions of one or more components of the data processing system 100. In other examples, a computer program product is provided comprising computer-readable instructions which, when executed by a computer system, cause the computer system to perform the method described above with reference to FIG. 3. In examples, the computer program product is a non-transient computer-readable storage medium.

The above embodiments are to be understood as illustrative examples of the invention. Further embodiments of the invention are envisaged. For example, one or more sets of parameters of a scene generator trained using the method described herein may be provided as part of a video game, allowing randomly generated scenes of one or more given scene types to be generated within the video game.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A computer-implemented method comprising:
generating, using a scene generator, first candidate scene data indicating a position and orientation for each of a first candidate set of three-dimensional objects with respect to a given co-ordinate system;
obtaining reference scene data corresponding to a first predetermined reference scene of a set of predetermined reference scenes and indicating a position and orientation for each of a reference set of three-dimensional objects with respect to the given co-ordinate system;
processing the first candidate scene data and the reference scene data, using a scene discriminator, to generate first discrimination data for estimating whether each of the first candidate scene data and the reference scene data corresponds to any predetermined reference scene of the set of predetermined reference scenes;
updating a set of parameter values for the scene discriminator using the first discrimination data;
generating, using the scene generator, second candidate scene data indicating a position and orientation for each of a second candidate set of three-dimensional objects with respect to the given co-ordinate system;
processing the second candidate scene data, using the scene discriminator with the updated set of parameter values for the scene discriminator, to generate second discrimination data for estimating whether the second candidate scene data corresponds to any predetermined reference scene of the set of predetermined reference scenes; and
updating a set of parameter values for the scene generator using the second discrimination data.

2. The method of claim 1, comprising:
generating, using the scene generator with the updated set of parameter values, output scene data indicating a position and orientation for each of an output set of three-dimensional objects with respect to the given co-ordinate system; and
processing the output scene data to generate a corresponding synthetic three-dimensional scene.

3. The method of claim 2, comprising rendering the generated synthetic three-dimensional scene to generate an image of the generated synthetic three-dimensional scene.

4. The method of claim 3, wherein the generated image comprises depth information.

5. The method of claim 3, wherein the generated image comprises annotations indicative of the positions and orientation of the three-dimensional objects in the generated synthetic three-dimensional scene.

6. The method of claim 1, wherein:
the scene generator comprises an artificial neural network; and
generating the each of the first candidate scene data and the second candidate scene data comprises:
sampling a respective noise variable from a predetermined noise distribution; and
processing the sampled respective noise variable using the artificial neural network to generate the candidate scene data.

7. The method of claim 1, wherein the scene discriminator comprises an artificial neural network.

8. The method of claim 1, wherein:
the first discrimination data indicates whether each of the first candidate scene data and the reference scene data corresponds to a real-life scene of a given scene type; and
the second discrimination data comprises an estimated probability that the second candidate scene data corresponds to a real-life scene of a given scene type.

9. The method of any claim 8, wherein obtaining the reference scene data comprises processing an image of a predetermined three-dimensional scene using a computer vision system.

10. The method of claim 1, wherein:
the first discrimination data comprises an estimated probability that each of the first candidate scene data and the reference scene data corresponds to any predetermined reference scene of the set of predetermined reference scenes; and
the second discrimination data comprises an estimated probability that the second candidate scene data corresponds to any predetermined reference scene of the set of predetermined reference scenes.

11. The method of claim 1, wherein:
the first discrimination data is indicative of a distance between the first candidate scene data and the reference scene data.

12. The method of claim 1, wherein each of the first candidate scene data, the second candidate scene data, and the reference scene data indicates one or more transformations applied to three-dimensional objects in the respective set of three-dimensional objects.

13. The method of claim 12, wherein each of the first candidate scene data, the second candidate scene data, and the reference scene data indicates one or more object parameters for three-dimensional objects in the respective candidate set of three-dimensional objects.

14. The method of claim 1, wherein each of the first candidate scene data, the second candidate scene data, and the reference scene data indicates one or more lighting conditions and/or one or more weather conditions.

15. A data processing system comprising:
a an object database arranged to store a plurality of labelled three-dimensional objects;
a scene generator operable to generate first candidate scene data indicating a position and orientation for each of a first candidate set of the labelled three-dimensional objects with respect to a given co-ordinate system;
a reference scene database arranged to store reference scene data corresponding to a first predetermined reference scene of a set of predetermined reference scenes and indicating a position and orientation for each of a reference set of labelled three-dimensional objects with respect to the given co-ordinate system;
a scene discriminator operable to process the first candidate scene data and the reference scene data to generate first discrimination data for estimating whether each of the first candidate scene data and the reference scene data corresponds to any predetermined reference scene of the set of predetermined reference scenes; and
a learner operable to update a set of parameter values for the scene discriminator using the first discrimination data,
wherein:
the scene generator is further operable to generate second candidate scene data indicating a position and orientation for each of a second candidate set of labelled three-dimensional objects with respect to the given co-ordinate system;
the scene discriminator is further operable to process the second candidate scene data, using the updated set of parameter values for the scene discriminator, to generate second discrimination data for estimating whether the second candidate scene data corresponds to any predetermined reference scene of the set of predetermined reference scenes; and the learner is further operable to update a set of parameter values for the scene generator using the second discrimination data.

16. The data processing system of claim 15, comprising:
a three-dimensional engine operable to process scene data generated by the scene generator to generate a corresponding synthetic three-dimensional scene.

17. A non-transient storage medium comprising machine-readable instructions which, when executed by a computer, cause the computer to perform the steps of:
generating, using a scene generator, first candidate scene data indicating a position and orientation for each of a first candidate set of three-dimensional objects with respect to a given co-ordinate system;
obtaining reference scene data corresponding to a first predetermined reference scene of a set of predetermined reference scenes and indicating a position and orientation for each of a reference set of three-dimensional objects with respect to the given co-ordinate system;
processing the first candidate scene data and the reference scene data, using a scene discriminator, to generate first discrimination data for estimating whether each of the first candidate scene data and the reference scene data corresponds to any predetermined reference scene of the set of predetermined reference scenes;
updating a set of parameter values for the scene discriminator using the first discrimination data;
generating, using the scene generator, second candidate scene data indicating a position and orientation for each of a second candidate set of three-dimensional objects with respect to the given co-ordinate system;
processing the second candidate scene data, using the scene discriminator with the updated set of parameter values for the scene discriminator, to generate second discrimination data for estimating whether the second candidate scene data corresponds to any predetermined reference scene of the set of predetermined reference scenes; and
updating a set of parameter values for the scene generator using the second discrimination data.

\* \* \* \* \*